United States Patent [19]
Katzen et al.

[11] 3,920,750
[45] Nov. 18, 1975

[54] PROCESS FOR PRODUCING VANILLIN
[75] Inventors: Raphael Katzen; Vincent B. Diebold; Jerald L. Mestemaker, all of Cincinnati, Ohio
[73] Assignee: Canadian International Paper Company, Montreal, Canada
[22] Filed: Mar. 21, 1974
[21] Appl. No.: 453,516

[52] U.S. Cl............................................. 260/600 A
[51] Int. Cl.² .......................................... C07C 45/00
[58] Field of Search ........... 260/600, 600 A; 23/283

[56] References Cited
UNITED STATES PATENTS

| | | | |
|---|---|---|---|
| 2,576,754 | 11/1951 | Fisher et al. | 260/600 |
| 2,758,017 | 8/1956 | Allen et al. | 23/283 |
| 2,762,692 | 9/1956 | Spitz et al. | 23/283 |

Primary Examiner—Bernard Helfin

[57] ABSTRACT

A process is provided for conducting liquid-gas reactions, especially the oxidation reaction involved in air oxidation of lignin-containing, alkaline, kraft black liquor. The process employs an oxidation apparatus comprising a vertically oriented container having inlet means in proximity to its bottom for both gas and liquid and outlet means in proximity to the top of the container. Disposed in staggered arrangement within said vertical container is a plurality of internal horizontal perforated plates extending over most of, but not all of, the cross section of the container and extending vertically downward from said horizontal perforated plates, an internal vertical solid baffle plate. In the operation of the process, gas and liquid are passed generally cocurrently upwardly through the container with the gas being collected under and passing vertically through the horizontal perforated plates of the oxidation apparatus. By virtue of the arrangement of the plates, the liquid flows horizontally under the horizontal perforated plates, thereby providing optimum dispersion of vertically flowing gas within the horizontally flowing liquid and thereby optimum contact of gas and liquid.

7 Claims, 3 Drawing Figures

PROCESS FOR PRODUCING VANILLIN

BACKGROUND OF THE INVENTION

The invention relates generally to a process employing an apparatus for contacting gases with liquid to provide optimum dispersion of the gas within the liquid and optimum reaction between the two. The process of the invention relates particularly to the production of vanillin by oxidizing the lignin contained in aqueous alkaline kraft black liquor with an oxygen containing gas.

In providing for the oxidation of kraft black liquor with an oxygen-containing gas to produce vanillin from the lignin-content of the liquor, it is desirous that there be employed an apparatus permitting optimum contact of the oxygen-containing gas, such as air, with the kraft black liquor. In the operation of such a process on a continuous basis, it is desirable that the oxygen-containing gas and the black liquor flow cocurrently during the oxidation operation. This is so, because it is desirable that at the end of the oxidation reaction the oxygen content of the gas be reduced from the concentration of oxygen in the gas at the beginning of the reaction. Vanillin, being an aldehyde, tends to undergo further reaction under more vigorous oxidation conditions to produce vanillic acid, which is unwanted. It is also essential that the gas be finely dispersed in the black liquor. The process of the invention employs apparatus which permits continuous operation.

Of the apparatus available in the prior art, Shah U.S. Pat. 3,567,400 discloses an apparatus which is essentially a container bisected by a single perforated plate above which flows the liquid to be reacted and beneath which is introduced air under pressure to pass upwardly through the perforated plate and to be reacted with the liquid flowing above the plate. This involves a single pass system in which the oxygen concentration of the gas is substantially the same in all positions within the apparatus. Also, only crude dispersion of the gas into the liquid is obtained.

Spitz et al. U.S. Pat. No. 2,762,692 discloses an apparatus for mixing gases with solids and liquids but provides none of the conditions suitable for reactions of the type contemplated.

Allen et al. U.S. Pat. No. 2,758,017 is concerned with an apparatus for oxidizing pulp liquors, but employs a countercurrent flow system in which liquid is introduced at the top of a column and air at the bottom, with the liquid passing downwardly over vertically suspended flat plates. While providing a substantial area of contact between gas and liquid, it is unsuited for the type of reaction contemplated by applicants, since the reacting gas is most concentrated or reactive at the end of the path of travel of the liquid. In the process of the present invention, using the apparatus of the invention and cocurrent operation, the fresh black liquor is richest in regard to oxygen content at the beginning of the process and depleted at the end. This tends to minimize the production of unwanted oxidation products such as vanillic acid.

SUMMARY OF THE INVENTION

The present invention provides an improved process for contacting liquids with gases, and particularly in conducting oxidation of the lignin in kraft black liquor by means of an oxygen-containing gas to produce vanillin.

The process employs an apparatus which includes a vertically extending container having inlet means for both gas and liquid in proximity to its lower end and outlet means in proximity to its upper end, and provided with a plurality of internal horizontal perforated plates in staggered arrangement having a vertically downwardly extending solid baffle plate at one end of each horizontal perforated plate. The staggered arrangement of these horizontal perforated plates with the downwardly extending solid baffle plates provides an aerating element in each horizontal plate whereby the reactant gas component is trapped underneath the plate and gas bubbles subdivided by the perforations in the horizontal plate. The size of the perforations determines the size of the gas bubbles. The size of the perforations is designed to provide optimum size gas bubbles with maximum contact surface and uniform distribution of gas. The gas from below the horizontal perforated plates passes upward through the perforations and contacts the liquid flowing cocurrently with it, but at that particular stage horizontally under the flat surface of the horizontal plate. Due to the staggered arrangement of the horizontal perforated plates and the downwardly vertically extending baffles, the rising air bubbles are prevented from coalescing and are redistributed into small bubbles at frequent intervals. This provides optimum contact between the gas and liquid.

The apparatus employed in the present invention provides optimum contact between gas and liquid even with variations in liquid flow. The apparatus is relatively simple to fabricate and maintain.

It is an object of the present invention to provide a process for oxidizing black liquor with oxygen whereby optimum contact between oxygen and liquor is provided.

It is another object to provide an improved process for oxidizing kraft black liquor to product vanillin.

Another object is to provide a process for oxidizing black liquor with oxygen in which the concentration of the oxygen is diminished at the end of the reaction.

The foregoing and other objects and advantages of the present invention will be apparent to those skilled in the art from the further description which follows, taken in conjunction with the appended drawings.

DETAILED DESCRIPTION OF THE INVENTION

Referring to the drawings.

Figure 1:
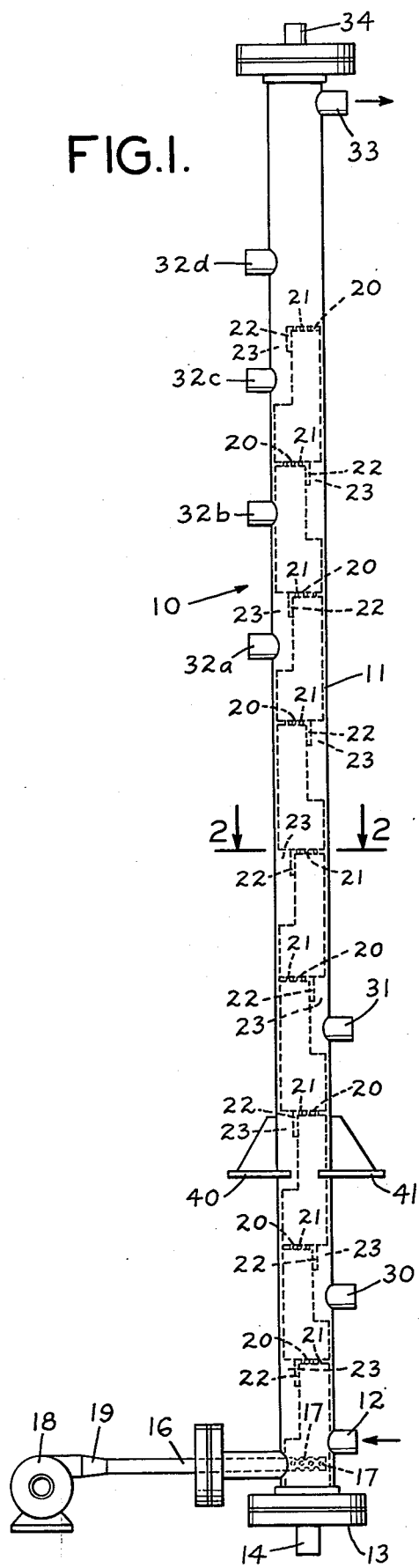
FIG. 1 is an elevation, of the apparatus employed in the process of the present invention.

Referring now to FIG. 1, the apparatus 10 employed is shown as a vertical extending substantially cylindrical column or container 11, having a liquid inlet 12 in close proximity to the bottom 13, the bottom being provided with a drain 14 to remove the contents of the apparatus when desired. The apparatus is provided with a gas inlet 16 in proximity to the bottom 13, having perforations 17 to permit finely-divided gas to be introduced near the bottom of the apparatus. The gas is desirably pumped into the gas inlet 16 by means of a fan or blower 18 through nozzle 19 into the gas inlet 16.

The column 11 is provided with a series of staggered, horizontal perforated plates 20 having perforations 21 with each horizontal plate extending over most of the cross section of the column 11 and having in each case a vertically downwardly extending solid baffle plate 22. In each case there is a space 23 between each horizontal perforated plate 20 and the walls of column 11 to provide for the upward flow of liquid. The column 11 is suitably equipped with openings such as 30 for pressure gauge means, 31 for temperature reading means and 32a, 32b, 32c, 32d for withdrawing liquid at different levels of the apparatus, should it be desired. Outlet 33 is a vent to withdraw the contents of the apparatus and outlet 34 is a relief valve.

The apparatus is supported in part by lugs 40 and 41.

Figure 2:
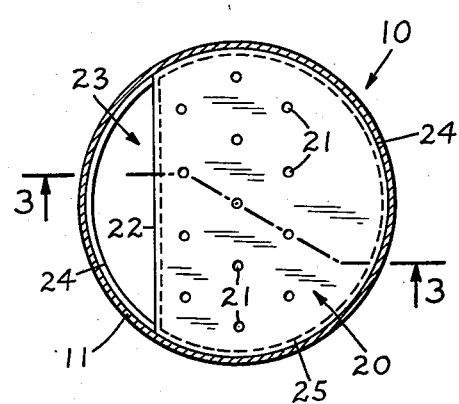
FIG. 2 is a sectional plan view taken along line 2—2 of FIG. 1 illustrating one of the horizontal perforated plates of the apparatus to a larger scale.

As shown in FIG. 2 the horizontal perforated plate 20 extends preferably over more than half of the cross-sectional area of the cylinder, such as about three-fourths of the area as shown in FIG. 2. It provides space 23 within the column for flow of liquid without the liquid passing through the perforations 21. As noted in FIG. 2, the perforations 21 are desirably positioned over the center of the cross section of the column 11. Preferably, the plate 20 is perforated over about one-half of the cross-sectional area of the column with the perforations being positioned in proximity to the vertically downwardly extending baffles 22, as shown in FIG. 2. This configuration provides optimum dispersion and flow characteristics. In the operation of the apparatus, the gas bubbles vertically upward through the column 11 and through the perforations 21, while the liquid is flowing horizontally over the perforated plates 20. In view of the staggered arrangement of the horizontal perforated plates 20 with their vertically downwardly extending baffles 22, gas is trapped under each of the horizontal plates so that the gas shall undergo further subdivision or dispersion at each plate through the perforations 21.

Figure 3:
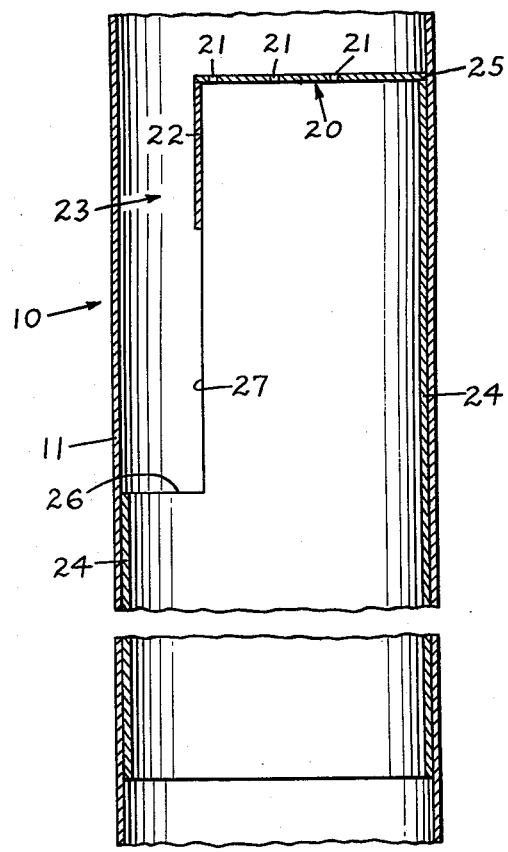
FIG. 3 is a vertical sectional view taken generally along line 3—3 of FIG. 2 illustrating in section, the perforations in the horizontal plate and the vertically downwardly extending solid baffle plate.

FIG. 3 shows a side view of the horizontal and vertical plates in FIG. 2.

In accordance with another desirable feature of the apparatus employed, the horizontal perforated plates 20 are mounted, as by welding, on sections 24 of internal pipe at the tops 25 of each section, as shown in FIGS. 2 and 3. These sections of internal pipe fit snugly the inner walls of the column 11, as shown in FIGS. 2 and 3, and the sections of pipe are placed one above the other. As shown in FIG. 3, the cylindrical walls of the pipe sections are cut away on the side on which the downwardly extending baffles 22 are placed, as shown by reference numerals 26 and 27. This permits freer vertical flow of liquid up the column. This construction aids in facilitating the maintenance and cleaning of the equipment.

Desirably, the perforations 21 are round and approximately one-sixteenth inch in diameter, although other sizes and cross-sectional shapes may be employed.

In the operation of the process of the invention, it is contemplated that the system shall be filled with a mixture of liquid and air throughout the column. As pointed out hereinabove, the flow of gas and liquid is cocurrent from bottom to top of the column 11. This is accomplished by introducing gas by the fan 18 through nozzle 19 into gas inlet 16 and out perforations 17. Liquid is introduced through liquid inlet 12 at the desired rate. The dispersed gas and liquid flow cocurrently upwardly through the column 11. Gas is preferentially trapped momentarily under horizontal perforated plates 20 and baffles 22, so that the gas will be finely divided and dispersed through perforations 21 to permit optimum mixing of gas and liquid. As the liquid flows substantially horizontally over the tops of perforated plates 20, it is intimately mixed with the gas bubbles as they escape through perforations 21. At the end of the flow through the column, liquid and residual gas are withdrawn at outlet 33 for separation and further treatment.

An example of the process of the present application to the oxidation of lignin-containing kraft black liquor to produce vanillin will now be described, using, of course, the aforesaid apparatus.

Example

A regular kraft mill black liquor from the cooking of mixed softwood species comprising jackpine, spruce and balsam was collected after removal of soap and was fortified with 50% sodium hydroxide solution to form a feed mixture of the following composition:

| | |
|---|---|
| Total solids | 200 grams per liter |
| lignin (precipitatable at pH 2) | 50 grams per liter |
| NaOH | 25 grams per liter |

This liquor was treated in a continuous manner with air in the apparatus illustrated in the drawings. Operating conditions were as follows:

| | |
|---|---|
| liquor feed in inlet 12, liters per hour | 38.6 |
| Air feed inlet 16, liters per hour | 3,620 |
| Reaction temperature, °C. | 210 |
| Pressure, psig | 400 |
| Retention time, hour | 0.4 |
| Oxygen/lignin, (w/w) | 0.5 |

The liquid and gaseous products emitting from outlet 33 had the following composition:

| | | | |
|---|---|---|---|
| Liquid: | Total solids | 218 | grams per liter |
| | Precipitatable lignin | 46 | " |
| | NaOH | 2.2 | " |
| | Vanillin | 1.55 | " |
| Gas: | Flow, liters per hour | 3,140 | |
| | Oxygen, % v/v | 6.4 | |

From these data, various derived values may be calculated for the comparison of efficiency, such as:

| | |
|---|---|
| Yield of vanillin on lignin | 3.0% |
| " on NaOH added | 7.8% |
| Vanillin, gram/liter/hour | 3.9 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for producing vanillin by oxidizing lignin-containing, alkaline, kraft black liquor with an oxygen containing gas, which comprises passing both a solution of said lignin-containing, alkaline, kraft black liquor and said oxygen containing gas cocurrently upwardly through an oxidation apparatus comprising a vertically oriented column, said column having a top and a bottom and a plurality of spaced horizontal gas diffusing plates disposed within said column and spaced between the top and the bottom and each providing a plurality of spaced perforations, with each horizontal perforated plate extending over most, but not all, of the horizontal cross section of said column, each of said horizontal perforated plates having a vertically downwardly extending solid baffle plate.

2. A process in accordance with claim 1, wherein the horizontal gas diffusing plates are in staggered arrangement within the vertically oriented column.

3. A process in accordance with claim 1, wherein the horizontal gas diffusing plates are alternately fixed to opposite sides within the vertically oriented column.

4. A process in accordance with claim 1, wherein the vertically downwardly extending solid baffle plates are substantially at right angles with the horizontal perforated plates.

5. A process in accordance with claim 1, wherein the spaced perforations on the horizontal plates are centered with respect to the cross-sectional area of the column.

6. A process in accordance with claim 1, wherein the spaced perforations on the horizontal plates cover about one half of the cross-sectional area of the column and are spaced in proximity to the vertically downwardly extending solid baffle plate.

7. A process according to claim 1, wherein the horizontal gas diffusing plates are mounted on internal sections which fit snugly with the walls of the vertically oriented container.

* * * * *